(12) United States Patent
Dunn

(10) Patent No.: US 10,296,232 B2
(45) Date of Patent: May 21, 2019

(54) SERVICE LEVEL BASED CONTROL OF STORAGE SYSTEMS

(71) Applicant: HGST Netherlands B.V., Amsterdam (NL)

(72) Inventor: Paul Dunn, Colorado Springs, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/841,850

(22) Filed: Sep. 1, 2015

(65) Prior Publication Data

US 2017/0060442 A1 Mar. 2, 2017

(51) Int. Cl.
*G06F 3/06* (2006.01)

(52) U.S. Cl.
CPC .......... *G06F 3/0613* (2013.01); *G06F 3/061* (2013.01); *G06F 3/065* (2013.01); *G06F 3/0608* (2013.01); *G06F 3/0625* (2013.01); *G06F 3/0634* (2013.01); *G06F 3/0685* (2013.01); *Y02D 10/154* (2018.01)

(58) Field of Classification Search
CPC ...... G06F 3/0613; G06F 3/0608; G06F 3/065; G06F 3/0685
See application file for complete search history.

(56) References Cited

U.S. PATENT DOCUMENTS

| 5,345,347 | A | 9/1994 | Hopkins et al. |
| 5,493,670 | A | 2/1996 | Douglis et al. |
| 7,095,201 | B1 | 8/2006 | Schreck et al. |
| 7,177,112 | B2 | 2/2007 | Settje et al. |
| 7,346,751 | B2 * | 3/2008 | Prahlad ............... G06F 3/0605 711/117 |
| 78,823,738 | | 2/2011 | More et al. |
| 7,949,795 | B2 | 5/2011 | Yoneyama |
| 8,495,221 | B1 * | 7/2013 | Tsunoda ............ H04L 67/1097 709/224 |
| 8,719,401 | B1 * | 5/2014 | Gulati ................ H04L 47/283 709/224 |
| 8,874,875 | B2 | 10/2014 | Bandic et al. |
| 2005/0141375 | A1 | 6/2005 | Ehrlich et al. |
| 2006/0053263 | A1 * | 3/2006 | Prahlad ............... G06F 3/0605 711/162 |

(Continued)

FOREIGN PATENT DOCUMENTS

| WO | 2012089727 | 7/2012 |
| WO | 2014098973 | 6/2014 |

OTHER PUBLICATIONS

"Surveillance HDD". Seagate Technology LLC. 2014. 2 pages.

(Continued)

*Primary Examiner* — Nanci N Wong

(57) ABSTRACT

To provide enhanced operation of data storage devices and systems, various systems, apparatuses, methods, and software are provided herein. In a first example, a data storage system is presented. The data storage system includes data storage devices comprising media for storage and retrieval of data. The data storage system includes a host interface configured to receive service level selections indicated by a host system for service level control of the one or more data storage devices. The data storage system includes a storage control system configured to operate the one or more data storage devices according to the service level selections.

21 Claims, 5 Drawing Sheets

(56) References Cited

U.S. PATENT DOCUMENTS

| | | | |
|---|---|---|---|
| 2009/0010264 A1* | 1/2009 | Zhang | H04L 47/2425 370/395.21 |
| 2010/0313203 A1* | 12/2010 | Dawson | G06F 1/3203 718/102 |
| 2012/0066439 A1* | 3/2012 | Fillingim | G06F 11/3485 711/103 |
| 2013/0031298 A1 | 1/2013 | Tan et al. | |
| 2013/0232261 A1* | 9/2013 | Wright | H04L 41/50 709/224 |
| 2014/0050227 A1* | 2/2014 | Goodson | H04L 5/0058 370/442 |
| 2014/0310434 A1* | 10/2014 | Strange | G06F 3/0653 710/16 |
| 2015/0032915 A1 | 1/2015 | Hur et al. | |
| 2016/0004475 A1* | 1/2016 | Beniyama | G06F 3/0605 710/74 |

OTHER PUBLICATIONS

Asano, H. "Power Save Operation". IBM: Technical Disclosure Bulletin, vol. 36, No. 05. 1993. IP.com Disclosure No. IPCOM000104730D 1 page.

* cited by examiner

SERVICE LEVEL INTERFACE 500

| SERVICE LEVEL OPTION | SERVICE LEVEL VALUE TYPE | SERVICE LEVEL VALUE SELECTION |
|---|---|---|
| SERVICE LEVEL AGREEMENT | LEVEL | low power SLA |
| MINIMUM TIME TO FIRST BIT | TIME | 1.1 seconds |
| MAXIMUM TIME TO FIRST BIT | TIME | 3.0 seconds |
| SEEK PERFORMANCE LEVEL | LEVEL 1-3 | level 2 |
| MAXIMUM SEEK VOLTAGE | VOLTAGE | 10 volts |
| SPINDLE PEAK SPIN UP TIME | TIME | 0.5 seconds |
| MINIMUM DATA THROUGHPUT | bps | 450 Mbps |
| MAXIMUM DATA THROUGHPUT | bps | 650 Mbps |
| PEAK POWER CONSUMPTION | WATTS | 5 watts |

FIGURE 5

SERVICE LEVEL BASED CONTROL OF STORAGE SYSTEMS

TECHNICAL FIELD

Aspects of the disclosure are related to the field of data storage and data storage device arrays in data storage systems.

TECHNICAL BACKGROUND

Computer and network systems such as data storage systems, server systems, cloud storage systems, personal computers, and workstations, typically include data storage devices for storing and retrieving data. These data storage devices can include hard disk drives (HDDs), solid state storage devices (SSDs), tape storage devices, optical storage devices, hybrid storage devices that include both rotating and solid state data storage elements, and other mass storage devices.

As computer systems and networks grow in numbers and capability, there is a need for ever increasing storage capacity. Data centers, cloud computing facilities, and other at-scale data processing systems have further increased the need for digital data storage systems capable of transferring and holding immense amounts of data. Data centers can house this large quantity of data storage devices in various rack-mounted and high-density storage configurations.

While densities and workloads for the data storage devices increase, any individual data enclosures can experience higher power dissipation which can lead to greater heat generation and potential data loss as well as contribute to increased costs for cooling of data center facilities. Some power saving measures have been included in many data storage devices, such as low power operation, idle modes, and other power management schemes. However, these schemes fail to offer host systems much control over the various detailed operations of the data storage device. Moreover, when many storage devices are included in a storage system, each storage device can have inherent variations between each storage device, which can lead to decreased ability to predict the operation of the storage devices.

OVERVIEW

To provide enhanced operation of data storage devices and systems, various systems, apparatuses, methods, and software are provided herein. In a first example, a data storage system is presented. The data storage system includes data storage devices comprising media for storage and retrieval of data. The data storage system includes a host interface configured to receive service level selections indicated by a host system for service level control of the one or more data storage devices. The data storage system includes a storage control system configured to operate the one or more data storage devices according to the service level selections.

In another example, a method of operating a data storage system is provided. The method includes storing and retrieving data in a plurality of data storage devices, receiving service level selections indicated by a host system for service level control of the one or more data storage devices, and operating the one or more data storage devices according to the service level selections.

In another example, a service level interface for a data storage apparatus is presented. The service level interface includes a host interface configured to present service level options for altering performance and power consumption of at least a data storage device associated with the service level interface. The host interface configured to receive one or more service level selections indicated by the host system. The service level interface includes a storage control system configured to operate at least the data storage device according to the one or more service level selections.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 5 is an illustration of a service level interface.

DETAILED DESCRIPTION

Figure 1:
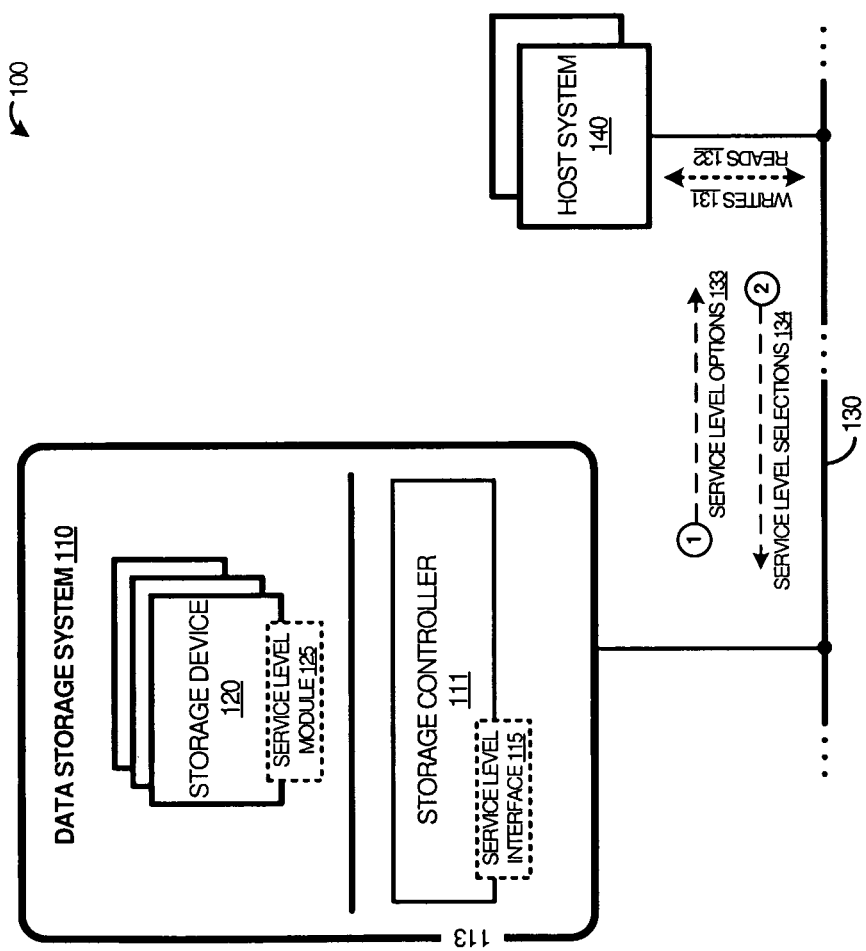
FIG. 1 is a system diagram illustrating a data system.

Data storage devices, such as hard disk drives (HDDs), solid state drives (SSDs), and hybrid disk drives that have both rotating and solid state storage elements, can be included in various arrayed configurations, such as rack-mounted enclosures which house dozens of individual drives. Other equipment can be provided in the enclosures, such as power supply equipment to provide power to the various storage devices, fans or cooling equipment, and various storage controllers or processing systems which can control the operations of the various data storage devices.

Data storage devices which incorporate rotating media, such as rotating magnetic media of hard disk drives or hybrid disk drives, also include various electromechanical elements to position read/write heads over the spinning media. These electromechanical elements include armatures, motors, actuators, voicecoils, servos, spindles, or other elements and electromechanical assemblies which can have associated power dissipation characteristics and performance characteristics. Typically, a storage device positions the associated read/write elements over a desired portion of the media as quickly as possible to reduce lag time for reading and writing of data. However, decreasing lag time for reading and writing of data can lead to higher power dissipations of the associated data storage device. Other characteristics and factors can affect power dissipation and performance, as discussed herein.

One such factor, namely Time to First Bit (TTFB) or Time to First Byte, can be affected by variations in performance and power dissipation characteristics of a storage device. TTFB indicates how quickly a storage device can provide the first pieces of data responsive to a request for that data. Other factors include peak power dissipations or peak voltages for seek operations, spin up times for spindle components, spindle angular speed or revolutions per minute (RPM), and data throughput. However, each data storage device can have variations in performance and power dissipation characteristics, even among devices of the same type. Performance and power dissipation characteristics can vary among each data storage device based on many considerations, such as temperature, manufacturing variability, spindle motor torque variation, spindle angular speed variation, or other factors.

In the examples herein, data storage devices can include various enhanced features to measure and characterize performance and power dissipations in-situ to ensure accurate control and operation of the associated data storage devices. Performance can be characterized and optionally normalized among various data storage device types, media types, manufacturers, manufacturing dates, manufacturing variability, or other variations, and this actual performance or power characteristics can be abstracted among diverse data storage devices for establishing standardized host service level options to achieve desired service levels. The data storage devices can also present these standardized service level options for selection and customization by a host system to operate the data storage devices according to desired performance or power dissipation. These enhancements can apply to entire data storage systems which include many data storage devices or to individual data storage devices.

As a first example of a data storage system, FIG. 1 is presented. FIG. 1 is a system diagram illustrating system 100. System 100 includes data storage system 110 and one or more host systems 140. Data storage system 110 and host system 140 communicate over storage link 130. Data storage system 110 can be included in an environment that includes one or more data storage arrays, such as a rack-mount computing environment.

In FIG. 1, data storage system 110 comprises an assembly that includes storage controller 111, enclosure 113, and one or more data storage devices 120. Each of data storage devices 120 can include one or more rotating storage media which include rotating media coupled to an associated spindle and read/write heads coupled to an associated armature assembly. In some examples, ones of data storage devices 120 includes solid state storage media, and may omit rotating media. Storage controller 111 is communicatively coupled to data storage devices 120. Although storage controller 111 is shown as internal to data storage system 110 in this example, it should be understood that in other examples storage controller 111 can be included in other elements external to data storage system 110.

In operation, data storage system 110 receives read or write transactions over storage link 130 issued by host system 140, such as write operations 131 and read operations 132. Responsive to read operations, individual data storage devices in data storage system 110 can retrieve data stored upon associated storage media for transfer to host system 140. Responsive to write operations, individual data storage devices in data storage system 110 stores data on the associated storage media. It should be understood that other components of data storage system 110 and data storage devices 120 are omitted for clarity in FIG. 1, such as transaction queues, chassis, power supplies, fans, interconnect, read/write heads, armatures, media, spindles, preamps, transceivers, processors, amplifiers, motors, servos, enclosures, and other electrical and mechanical elements.

Data storage system 110 also includes service level interface 115. In some examples, service level interface 115 is provided by storage controller 111, although variations are possible. Service level interface 115 can provide performance options 133 to host system 140, and receive service level selections 134 from host system 140. In some examples, service level interface 115 can comprise one or more drivers, application programming interfaces (APIs), user interface elements, graphical user interface elements, or other elements which allow one or more host systems to select performance options for operating the elements of data storage system 110. In further examples, service level module 125 is provided by each of storage devices 120. Functions performed by service level interface 115 can also be performed by service level module 125 or in combination with service level module 125.

Figure 2:
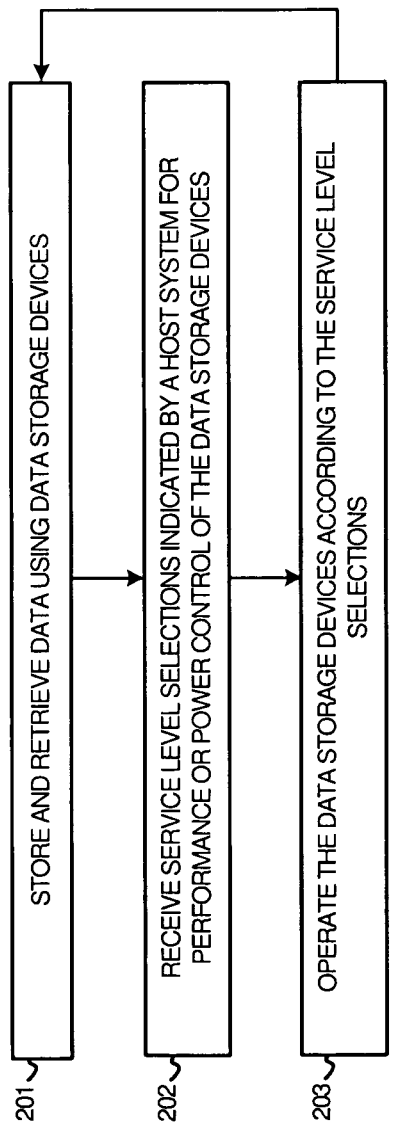
FIG. 2 is a flow diagram illustrating a method of operation of a data storage system.

To further illustrate the operation of data system 100, FIG. 2 is provided. FIG. 2 is a flow diagram illustrating a method of operating data storage system 110. The operations of FIG. 2 are referenced below parenthetically. In FIG. 2, data storage system 110 stores and retrieves (201) data in data storage system 110 using data storage devices 120. Data storage system 110 receives read and write operations over host interface 130 and ones of data storage devices 120 can handle these operations, such as by storing write data or retrieving read data. Read operations can include reads 132 received by storage controller 111, and write operations can include writes 131 received by storage controller 111. Other transactions or operations can be received for handling by storage controller 111, such as service level selections, performance commands, power control commands, metadata operations, maintenance operations, or administration operations, among others.

Data storage system 110 receives (202) service level selections indicated by host system 140 for service level control of data storage devices 120. In FIG. 1, service level interface 115 of storage controller 111 receives the service level selections over link 130. Host system 140 issues service level selections which can affect performance or power dissipation of data storage devices 120. These service level selections can indicate service level designations, power selections, performance selections, or other selections. These selections can be made for all storage drives in data storage system 110, or can be made on a per-device basis, such as for specific ones of data storage devices 120, or can be made on other granularities, such as for specific logical volumes, for only read operations or write operations, for a specific storage address range, or for specific storage transactions or storage operations, among other designations and granularities. Timers or counters can be indicated to only apply the selections for a predetermined duration or number of operations.

The specific service level factors that are selected by host system 140 can include those mentioned above, such as selections for TTFB performance, seek performance, spin up performance for spindle components, spindle RPM performance, and data throughput performance, among other selections. Host system 140 can indicate either specific values or levels for the service level factors or a range of acceptable service level values or levels, and service level interface 115 or ones of service level modules 125 can implement the desired values or levels for the service level factors across the various data storage devices 120. Alternatively, host system 140 can indicate a desired power dissipation for the various service level factors and service level interface 115, service level modules 125, or storage controller 111 can then calculate associated values or levels for the service level factors that corresponds to the desired power dissipations.

Power dissipation selections can be indicated by host system 140 in terms of how much energy is desired to be consumed within defined time windows. For example, host system 140 can indicate to limit peak power dissipation by specifying "<X joules within Y milliseconds" as a parameter, or indicate to limit average power dissipation by specifying "<A joules within B hours." Other power dissipation designations can be employed, such as instantaneous peak power dissipations in Watts.

In some examples, service level interface 115 presents one or more service level options 133 to host system 140. Service level options 133 can be presented to host system 140 via a driver interface, software interface, user interfaces, console or text interface, API, or other interface. Host system 140 can select among the presented service level options 133, and select desired service level factors and desired values or levels for those factors. For example, host system 140 can select TTFB as a service level factor to alter, and indicate a desired TTFB performance value, such as in units of time. Alternatively, host system 140 can designate a peak power dissipation for TTFB operations and indicate this peak power dissipation to service level interface 115 which can responsively determine a corresponding TTFB performance value or level (such as time) to achieve the desired peak power dissipation.

Data storage system 110 operates (203) data storage devices 120 according to the service level selections. As mentioned above, the desired service level can be achieved by selecting among various performance factors and levels or values for those factors. Alternatively or in combination, power dissipation values can be selected. When performance factors and levels or values are specified by host system 140, then storage controller 111 can control associated ones of data storage devices 120 according to the desired performance levels or values.

The control of data storage devices 120 can be managed in combination by storage controller 111 and service level modules 125 in some examples. For instance, storage controller 111 can receive the service level selections from host system 140 and transfer ones of the service level selections to service level modules 125 for implementation by associated data storage devices 120. Storage controller 111 can identify appropriate commands to issue to data storage devices 120 to control data storage devices 120 according to the service level selections. Data storage devices 120 can receive the commands and operate according to the service level selections. In further examples, storage controller 111 can implement the service level selections to control data storage devices 120 directly. Specifically, power levels might be specified by host system 140, and storage controller 111 can determine associated performance values or performance levels that corresponds to the desired power levels, and control associated ones of data storage devices 120 according to the determined performance levels or values.

However, in many examples, variations exist between ones of data storage devices 120 regarding the service level factors and performance/power values or levels. For example, each of data storage devices 120 can have device-to-device variability which can lead to slightly different specifications or power consumptions for various operations of the device components. This device-to-device variability can occur in devices of the same type, and can be from manufacturing variability, temperature variation, loading levels, lifetime or age, or other factors. Also, different device types can be employed, such as brands, manufacturers, models, manufacturing dates, or media types, among other differences. These differences can also lead to different performance outcomes and power dissipations among the various ones of data storage devices 120.

Storage controller 111 or other elements of data storage system 110 can characterize the performance and power dissipations of data storage devices 120 to establish service level metrics. Alternatively, service level modules 125 of each data storage device 120 can characterize associated performance and power dissipations. This characterization can be used to determine the variability in data storage devices 120 for various operations or activities, such as read/write operations, seek operations, time to first bit operations, and data throughputs, among others.

Storage controller 111 can normalize the variability among performance and power dissipation for ones of data storage devices 120 to establish consistent performance or power outcomes for any service level options or service level selections made by host system 140. A standardized set of service level options can be presented to host system 140 based on the available or supported operations of data storage devices 120 and the measured service level metrics. Storage controller 111 can operate data storage devices 120 according to the normalized service level to achieve consistent performance levels or power levels of data storage devices 120 while presenting a standardized set of performance options or power options to host system 140.

When storage controller 111 or service level interface 115 receive service level selections for more than one of data storage devices 120, such as for the entirety of data storage system 110, then the service level selections can be allocated or distributed over various ones of data storage devices 120 to achieve the service level selections. When multiple service level selections are made for data storage system 110, then the service level selections can be aggregated and distributed over various ones of data storage devices 120 to achieve the service level selections. For example, when a power dissipation level is specified for data storage system 110, then storage controller 111 can subdivide the power level among data storage devices 120 to allocate a portion of the power dissipation level to each of data storage devices 120 and achieve the power dissipation level. In another example, when more than one power dissipation level is specified for data storage devices 120, such as in more than one service level selection issued by host system 140, then storage controller 111 can aggregate the service level selections among the data storage devices to establish a power dissipation level among data storage devices 120. Other performance factors can be allocated or aggregated among the data storage devices.

Returning to the elements of FIG. 1, data storage system 110 comprises a plurality of data storage devices 120. These data storage devices are coupled to storage controller 111 by one or more storage links, which can comprise a serial ATA interface, Serial Attached Small Computer System (SAS) interface, Integrated Drive Electronics (IDE) interface, Non-Volatile Memory Express (NVMe) interface, ATA interface, Peripheral Component Interconnect Express (PCIe) interface, Universal Serial Bus (USB) interface, wireless interface, Direct Media Interface (DMI), Ethernet interface, networking interface, or other communication and data interface, including combinations, variations, and improvements thereof. Data storage system 110 can also comprise cache systems, chassis, enclosures, fans, interconnect, cabling, or other circuitry and equipment.

Storage controller 111 includes processing circuitry, communication interfaces, and one or more non-transitory computer-readable storage devices. The processing circuitry can comprise one or more microprocessors and other circuitry that retrieves and executes firmware from memory for operating as discussed herein. The processing circuitry can be implemented within a single processing device but can also be distributed across multiple processing devices or sub-systems that cooperate in executing program instructions. Examples of the processing circuitry include general purpose central processing units, application specific processors, and logic devices, as well as any other type of processing device, combinations, or variations thereof. The communication interfaces can include one or more storage interfaces for communicating with host systems, networks, and the like. The communication systems can include transceivers, interface circuitry, connectors, buffers, microcontrollers, and other interface equipment.

Enclosure 113 comprises structural elements to house and structurally support the elements of data storage system 110. Enclosure 113 can include power supplies, chassis elements, frames, fastening elements, rackmount features, ventilation features, among other elements. In many examples, enclosure 113 also includes fans or other cooling and ventilation elements for providing airflow to the elements of data storage system 110.

Each of data storage devices 120 includes one or more computer readable storage media. The storage media can include rotating magnetic storage media or solid state storage media, among other media types, including combinations thereof. In rotating media types, the media are accessible via one or more read/write heads and associated electromechanical elements. Data storage devices 120 can also each include processing circuitry, communication interfaces, spindles, armatures, preamps, transceivers, processors, amplifiers, motors, servos, enclosures, and other electrical and mechanical elements. Data storage devices 120 can each comprise a hard disk drive, hybrid disk drive, solid state drive, or other computer readable storage device, including combinations thereof. Data storage devices 120 can each include further elements. The computer readable storage media of data storage devices 120 can each include rotating magnetic storage media, but can additionally include other media, such as solid state drive elements, caches, or cache systems. These other media can include solid state storage media, optical storage media, non-rotating magnetic media, phase change magnetic media, spin-based storage media, or other storage media, including combinations, variations, and improvements thereof. In some examples, data storage devices 120 each comprise a hybrid hard drive employing solid state storage elements in addition to rotating magnetic storage media. Associated storage media can employ various magnetic storage schemes, such as random write techniques, shingled magnetic recording (SMR), perpendicular magnetic recording (PMR), or heat-assistant magnetic recording (HAMR), including combinations, variations, and improvements thereof.

Host system 140 can include processing elements, data transfer elements, and user interface elements. In some examples host system 140 is a central processing unit of a computing device or computing system. In other examples, host system 140 also includes memory elements, data storage and transfer elements, controller elements, logic elements, firmware, execution elements, and other processing system components. In yet other examples, host system 140 comprises a RAID controller processor or storage system central processor, such as a microprocessor, microcontroller, Field Programmable Gate Array (FPGA), or other processing and logic device, including combinations thereof. Host system 140 can include, or interface with, user interface elements which can allow a user of data system 100 to control the operations of data system 100 or to monitor the status or operations of data system 100. These user interface elements can include graphical or text displays, indicator lights, network interfaces, web interfaces, software interfaces, user input devices, or other user interface elements. Host system 140 can also include interface circuitry and elements for handling communications over bus 130, such as logic, processing portions, buffers, transceivers, and the like.

Bus 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one bus 130 is shown in FIG. 1, it should be understood that one or more discrete links can be employed between the elements of data system 100.

Figure 3:
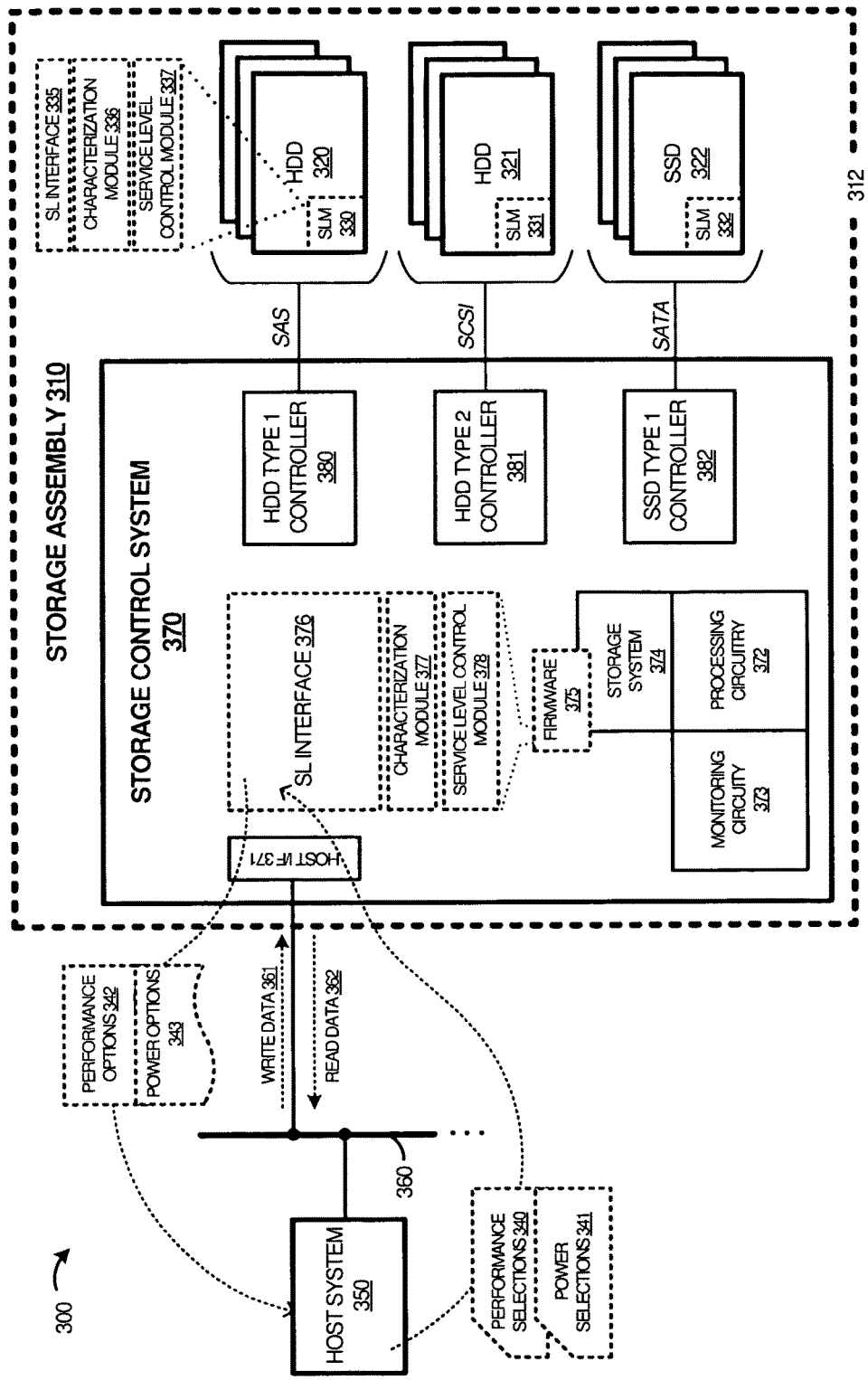
FIG. 3 is a system diagram illustrating a data system.

As a further example data storage system employing a data storage array, FIG. 3 is presented. FIG. 3 is a system diagram illustrating data storage system 300. Data storage system 300 includes storage assembly 310 and one or more host systems 350. Storage assembly 310 and host system 350 communicate over storage link 360. Various elements of storage assembly 310 can be included in data storage system 110 of FIG. 1, although variations are possible. Although one storage assembly 310 is shown in FIG. 3, it should be understood that more than one storage assembly could be included and linked to host system 350 or other host systems, such as in a data storage environment employing many data storage arrays.

Storage assembly 310 can comprise a storage assembly with associated enclosure and structural elements which is insertable into a rack that can hold other storage assemblies, such a rackmount server environment. The enclosure can include structural elements to mount the plurality of storage devices and can also include at least one external connector for communicatively coupling control system 370 or host interface 371 of storage assembly 310 over storage link 360.

Storage assembly 310 can comprise a redundant array of independent disks (RAID) array, or a JBOD device ("Just a Bunch Of Disks") device which include a plurality of independent disks which can be spanned and presented as one or more logical drives to host system 350. In some examples, storage assembly 310 comprises a virtual bunch of disks (VBOD) which adds one or more layers of abstraction between physical storage devices and external interfaces. A VBOD can employ various types of magnetic recording technologies and abstract front-end interactions from the particular recording technology. For example, shingled magnetic recording (SMR) hard disk drives typically have inefficiencies for random writes due to the shingled nature of adjacent tracks for data. In SMR examples, the VBOD abstracts the SMR drives and allows random writes and random reads while still having underlying SMR media which ultimately hold the associated data. Other recording techniques can be employed, such parallel magnetic recording (PMR), or heat-assisted magnetic recording (HAMR), including variations, improvements, and combinations thereof.

Storage link 360 can include one or more links, although a single link is shown in FIG. 3. Storage link 360 can comprise a storage or disk interface, such as Serial Attached ATA (SATA), Serial Attached SCSI (SAS), FibreChannel, Universal Serial Bus (USB), SCSI, InfiniBand, NVMe, Peripheral Component Interconnect Express (PCIe), Ethernet, Internet Protocol (IP), or other parallel or serial storage or peripheral interfaces, including variations and combinations thereof.

Host system 350 can include one or more computing and network systems, such as personal computers, servers, cloud storage systems, packet networks, management systems, or other computer and network systems, including combinations and variations thereof. In operation, host system 350 issues read and write commands or operations to storage assembly 310 over storage link 360, among other commands or operations which can include performance selections, power control selections, control instructions, metadata retrieval operations, configuration instructions, and the like. Likewise, storage assembly 310 can transfer read data over storage link 360, among other information such as graphical user interface information, status information, operational information, drive seek information, temperature information, power information, failure notifications, alerts, and the like.

Storage assembly 310 includes a plurality of storage devices comprising hard disk drives (HDDs) and solid state storage devices (SSDs), namely HDDs 320-321 and SSD 322, although any number of storage devices can be included. Although FIG. 3 indicates one or more hard disk drives for each of HDD 320-321, it should be understood that HDD 320-321 can each comprise one or more hybrid disk drives which comprise rotating media and solid state storage components which work in tandem. In further examples, further SSDs, magnetic non-rotating drives, phase change drives, optical storage devices, or other non-transitory computer-readable storage devices are employed. Each of HDDs 320-321 and SSD 322 are coupled to control system 370 by one or more storage links via an associated controller 380-382, which in this example comprises Serial Attached SCSI (SAS) links, SCSI links, or Serial ATA (SATA) links, although other link types can be employed.

Each of HDDs 320-321 can comprise similar elements, such as rotating storage media coupled to a rotating spindle and drive motor, read/write heads coupled to an associated armature and driver elements. HDD 320-321 can include further elements, such as preamps, transceivers, processors, amplifiers, motors, servos, cases, seals, enclosures, power sensors, temperature sensors, and other electrical and mechanical elements. SSD 322 comprises one or more solid state media and associated write and read circuitry. SSD 322 can comprise flash memory, phase change memory, or other non-rotating storage media.

HDDs 320-321 and SSD 322 each comprise associated service level modules (SLMs) 330-332. Service level modules 330-332 each can operate as described herein for portions of storage control system 370, such as portions of SL interface 376, characterization module 377, or service level control module 378, although variations are possible. HDD 320 shows a detailed view of one example of SLM 330, specifically SL interface 335, characterization module 336, and service level control module 337. The operations and structures described herein for SL interface 376, characterization module 377, or service level control module 378 can be employed in SL interface 335, characterization module 336, and service level control module 337. Moreover, each of SLMs 331-332 can include elements similar to SLM 330.

Storage assembly 310 control system 370. Control system 370 includes host interface (I/F) 371, processing circuitry 372, drive controllers 380-382, and storage system 374. Furthermore, control system 370 includes firmware 375 which includes service level agreement (SL) interface 376, characterization module 377, and service level control module 378 which, when executed by at least processing circuitry 372, operates as described below.

Monitoring circuitry 373 comprises one or more sensing elements for measuring power and performance information of storage assembly 310, and in particular of HDDs 320-321 and SSD 322. The information monitored can be related to the various service level options selectable or configurable by host system 350, such as seek performance, time to first bit performance, spindle speed performance, power consumption, or other information. Power sensors can be employed to measure power consumption, current draw, voltage levels, or other associated power related properties of storage assembly 310, such as power consumption for HDDs 320-321 and SSD 322 and other components associated with storage assembly 310. Power sensors can comprise current sense resistors, operational amplifiers, comparators, magnetic current sensing elements, Hall Effect sensing elements, voltage dividers, operational amplifiers, analog or digital voltage sensing elements, among other elements. Monitoring circuitry 373 can also include various interfaces for communicating measured information, such as to control system 370. These interfaces can include transceivers, analog-to-digital conversion elements, amplifiers, filters, signal processors, among other elements. In some examples, elements and functions of monitoring circuitry 373 can be included in processing circuitry 372.

In FIG. 3, each of HDDs 320-321 and SSD 322 also optionally includes associated monitoring elements, which can comprise similar elements as monitoring circuitry 373. The monitoring elements can be included in or controlled by associated SLM 330-332. The monitoring elements can comprise power monitors included among the electronic or mechanical elements of each of HDDs 320-321 and SSD 322, and can measure power consumption associated with the drive. These monitoring elements can comprise other monitoring elements which monitor time to first bit performance, seek performance, throughput performance, and spindle speed performance, among other performance information. Each drive can also include equipment and circuitry to transfer information determined by the associated monitoring elements over an associated storage interface 380-382 to control system 370.

Storage enclosure 312 comprises structural elements to house and structurally support the elements of storage assembly 310. Enclosure 312 can include chassis elements, frames, fastening elements, rackmount features, ventilation features, among other elements. In many examples, enclosure 312 also includes fans or other cooling and ventilation elements for providing airflow to the elements of storage assembly 310. Enclosure 312 can also include power supply elements to convert external power sources or provide various forms of electrical power to the elements of storage assembly 310.

Control system 370 handles storage operations for storage assembly 310, such as receiving storage operations from host systems over storage link 360 in host interface 371. Write data 361 can be received in one or more write operations, and read data 362 can be provided to hosts responsive to one or more read operations. An interface can be provided to a host system, such as a single (or redundant) Ethernet interface, SATA interface, SAS interface, Fibre-Channel interface, USB interface, SCSI interface, Infini-Band interface, NVMe interface, PCIe interface, or IP interface, which allows for the host system to access the storage capacity of HDD assembly. Control system 370 can establish any number of logical volumes or logical storage units across the various HDDs in storage assembly 310, which can comprise spanning, redundant arrays, striping, or other data storage techniques.

Host interface 371 includes one or more storage interfaces for communicating with host systems, networks, and the like over at least link 360. Host interface 371 can comprise transceivers, interface circuitry, connectors, buffers, microcontrollers, and other interface equipment. Host interface 371 can also include one or more I/O queues which receive storage operations over link 360 and buffers these storage operations for handling by processing circuitry 372.

Control system 370 also includes processing circuitry 372, drive controllers 380-382, and storage system 374. Processing circuitry 372 can comprise one or more microprocessors and other circuitry that retrieves and executes firmware 375 from storage system 374. Processing circuitry 372 can be implemented within a single processing device but can also be distributed across multiple processing devices or sub-systems that cooperate in executing program instructions. Examples of processing circuitry 372 include general purpose central processing units, application specific processors, and logic devices, as well as any other type of processing device, combinations, or variations thereof. In some examples, processing circuitry 372 includes a system-on-a-chip device or microprocessor device, such as an Intel Atom processor, MIPS microprocessor, and the like. In some examples, control system 370 comprises a RAID controller, RAID processor, or other RAID circuitry. In other examples, control system 370 handles management of a particular recording technology, such as SMR or HAMR techniques. As mentioned herein, elements and functions of drive controllers 380-382 can be integrated with processing circuitry 372.

Drive controllers 380-382 can each include one or more drive control circuits and processors which can control various data handling among the various HDDs of storage assembly 310. Drive controllers 380-382 can each comprise storage interfaces, such as SAS, SCSI, or SATA interfaces to couple to the various storage devices in storage assembly 310. In some examples, drive controllers 380-382 and processing circuitry 372 communicate over a peripheral component interconnect express (PCIe) interfaces or other communication interfaces. In some examples, drive controllers 380-382 each comprise a RAID controller, RAID processor, or other RAID circuitry. In other examples, each of drive controllers 380-382 handle management of a particular recording technology, such as flash, SMR, or HAMR techniques.

Drive controllers 380-382 also can assist in characterizing performance of the various attached storage devices, such as establishing values for various standardized service level options, such as power or performance. Drive controllers 380-382 can each provide information to processing circuitry 372 related to power dissipation, performance, characterization of performance, normalization of performance, or other operations. As mentioned herein, elements and functions of drive controllers 380-382 can be integrated with processing circuitry 372 or included within the storage drives themselves.

Storage system 374 can comprise any non-transitory computer readable storage media readable by processing circuitry 372 or drive controller 373 and capable of storing firmware 375. Storage system 374 can include volatile and nonvolatile, removable and non-removable media implemented in any method or technology for storage of information, such as computer readable instructions, data structures, program modules, or other data. In addition to storage media, in some implementations storage system 374 can also include communication media over which firmware 375 can be communicated. Storage system 374 can be implemented as a single storage device but can also be implemented across multiple storage devices or sub-systems co-located or distributed relative to each other. Storage system 374 can comprise additional elements, such as a controller, capable of communicating with processing circuitry 372. Examples of storage media of storage system 374 include random access memory, read only memory, magnetic disks, optical disks, flash memory, SSDs, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Firmware 375 can be implemented in program instructions and among other functions can, when executed by control system 370 in general or processing circuitry 372 in particular, direct control system 370 or processing circuitry 372 to operate as described herein. Firmware 375 can include additional processes, programs, or components, such as operating system software, database software, or application software. Firmware 375 can also comprise software or some other form of machine-readable processing instructions executable by processing circuitry 372.

In at least one implementation, the program instructions can include first program instructions that direct control system 370 to handle read and write operations among the data storage devices, measure, monitor, and control performance information for the various storage devices included in storage assembly 310 (service level control module 378), characterize differences in performance or power consumption among the various storage devices and normalize performance among the various storage devices (characterization module 377), and present one or more interfaces to host systems to allow selection of performance or power options (SL interface 376), among other operations.

In general, firmware 375 can, when loaded into processing circuitry 372 and executed, transform processing circuitry 372 overall from a general-purpose computing system into a special-purpose computing system customized to operate as described herein. Encoding firmware 375 on storage system 374 can transform the physical structure of storage system 374. The specific transformation of the physical structure can depend on various factors in different implementations of this description. Examples of such factors can include, but are not limited to the technology used to implement the storage media of storage system 374 and whether the computer-storage media are characterized as primary or secondary storage. For example, if the computer-storage media are implemented as semiconductor-based memory, firmware 375 can transform the physical state of the semiconductor memory when the program is encoded therein. For example, firmware 375 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 4:
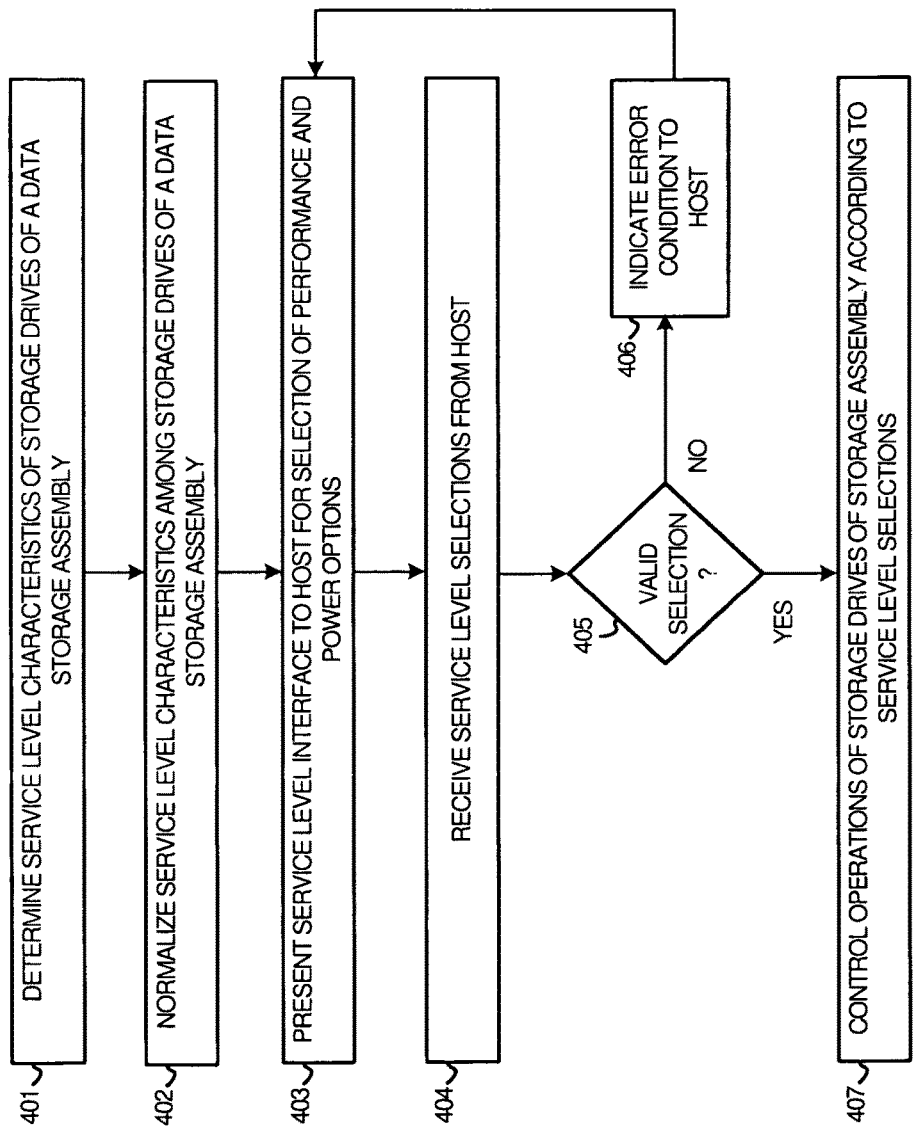
FIG. 4 is a flow diagram illustrating a method of operation of a data storage system.

To further illustrate the operation of system 300 and storage assembly 310, FIG. 4 is presented. FIG. 4 is a flow diagram illustrating a method of operation of storage assembly 310. The operations of FIG. 4 are referenced below parenthetically. The various operations described herein for FIG. 4 can be performed by any combination of elements in storage assembly 310, such as processing circuitry 372, monitoring circuitry 373, drive controllers 380-382, or by SLM elements of HDDs 320-321 and SSD 322, among other elements of system 300.

Storage control system 370 determines (401) service level characteristics of storage devices of a data storage assembly, and normalizes (402) the service level characteristics among storage devices of a data storage assembly. In some examples, storage control system 370 characterizes power consumption and performance of the one or more data storage devices in storage array 310 to establish performance and power metrics for the one or more data storage devices. Storage control system 370 can then normalize the performance and power metrics among variations across the one or more data storage devices and establish performance or power targets for each of the one or more data storage devices based on the normalized metrics, where the targets are used by storage control system 370 to operate the one or more data storage devices according to the one or more service level selections made by host systems. Characterization module 377 can be employed to determine the service level characteristics and normalize or standardize the service level characteristics. Performance or power consumption of HDDs 320-321 and SSD 322 can be characterized and normalized among various data storage device types, media types, manufacturers, manufacturing dates, manufacturing variability, or other variations, to abstract actual performance of diverse data storage devices from host selections for achieving desired performance.

In other examples, each of HDDs 320-321 and SSD 322 can characterize their own power consumption and performance characteristics in an associated one of SLM 330-332, such as in characterization module 336 of SLM 330. Each of HDDs 320-321 and SSD 322 can then provide metrics related to the power consumption and performance characteristics to storage control system 370. In yet further examples, each of HDDs 320-321 and SSD 322 do not provide these metrics to storage control system 370 and instead monitor and adjust their own activity according the metrics when various service level commands are received, as discussed further below.

Variations can exist between the data storage devices employed in storage assembly 310. For example, HDDs 320 can include an array of more than one HDD of a first type of HDD, and each of HDD 320 can have device-to-device variations in exact performance specifications or power consumptions, even when HDDs 320 are of the same manufacturer, type, or model. Likewise, device-to-device variability ones of HDDs 321 and SSDs 322 can exist and allow for deviation from performance specifications or power consumptions specified by a manufacturer. This device-to-device variability can be due to storage capacity, manufacturing variability, manufacturing dates, temperature variations, loading levels, lifetime or age, media defect quantities, or other factors. In addition to device-to-device variability among devices of the same type, device-to-device variability can also exist due to different device types being employed, such as having different types, models, or manufacturers of devices for HDD 320, HDD 321, and SSD 322. Further device-to-device variability can occur from different or media types employed, such as magnetic or solid state, among other differences.

Data storage devices which incorporate rotating media, such as rotating magnetic media of hard disk drives or hybrid disk drives, include various electromechanical elements to position read/write heads over the spinning media. These electromechanical elements include armatures, motors, actuators, voicecoils, servos, spindles, or other elements which can have associated power dissipation characteristics and performance characteristics for a plurality of service level factors. Data storage devices which include solid state media, such as flash media or other solid state media, can have other service level factors associated therewith, such as peak power dissipation, write voltages, wear-leveling performance, throughput, or other service level factors.

These service level factors are characterized to identify actual in-situ values or metrics of the data storage devices. The characterizations can comprise deviations from manufacturer specified values or establish new baseline values for the various service level factors. Typically, a specific data storage device will have many of these service level factors identified and specified by a manufacturing process or due to a design selection. However, variability between devices of the same type and devices of different types can lead to inaccurate or ineffective control of the performance factors. Moreover, current conditions can prompt changes to the service level factors and create variability among devices, such as temperature changes, loading changes, and other operational and environmental conditions.

A first service level factor comprises a seek time performance factor. Armatures of rotating media storage devices position associated read/write elements over a desired portion of the media that corresponds to storage locations of data to be written or read. The delay to position the read/write heads to the proper storage location on the media is referred to as a seek time. Typically, the read/write heads are moved as quickly as possible to reduce seek times for reading and writing of data. However, decreasing the seek times for reading and writing of data can lead to higher power dissipations of the associated data storage device. Moreover, when voicecoil circuitry is employed to move the armature and position the read/write heads, a corresponding drive voltage actuates the voicecoil. Increases in peak voltages correspond to faster seek times, and thus faster armature movement. These increased peak voltages can also correspond to increased power dissipation and increased seek performance.

A second service level factor comprises a Time to First Bit (TTFB) or Time to First Byte performance factor. TTFB indicates how quickly a storage device can provide the first bits or bytes of data responsive to a request for that data. TTFB can include delays for spinning a media up to a predefined rotation rate and moving read/write heads to an appropriate storage location on the media. Increases in TTFB performance, corresponding to decreases in TTFB times, can lead to increased power dissipation by a storage device.

A third service level factor can include a spin up time for spindle components of the data storage device. In data storage devices with rotating media, such as hard disk drives, the rotating media is spun using a spindle coupled to the media as well as a motor element to provide rotary motion to the media. Typically, the media is spun up to a predetermined angular speed as quickly as possible to reduce lag in startup times, wake up times, or seek times from idle modes. Faster spin up times correspond to increased power dissipation by the motor/spindle components, and slower spin up times correspond to decreased power dissipation.

A fourth service level factor can include the angular speed or rotation rate of the media provided by the associated spindle/motor. For examples, a hard disk drive can have a specified angular speed in revolutions per minute (RPM), such as 5400 RPM, 7200 RPM, or 10000 RPM, among others. This angular speed is typically predetermined for a particular hard disk drive and the various electromechanical components are selected to support the specific speed. However, variability in manufacturing and operation conditions can lead to slight variations on the rotation rate, which can deviate from the predetermined rotation rate. Moreover, in devices can use different rotation rates for different types of devices, and more than one predetermined rotation rate can be employed in storage assembly 310.

A fifth service level factor can include data throughput. Data throughput can vary based on many factors, and can be influenced by the other factors described above, such as seek time, TTFB, spin up time, and rotation rate, among other factors which can vary based on manufacturing, present conditions, or among devices of different types. Even when a read or write throughput is specified by a manufacturer for the data storage device, variations can occur.

Other service level factors include actual power dissipations which vary from idealized or manufacturer-specified factors or metrics. All of the factors described above can have associated power dissipations. There is also device-to-device variability in power dissipation for data storage devices of the same type or operated at the same performance values. These power dissipations can also vary from drive to drive, or device to device based on the various operational and manufacturing variability described above.

To provide consistent and accurate control of the data storage devices in storage assembly 310 and to present a consistent service level interface for a host to control the various performance factors and power dissipations for storage assembly, processing circuitry 372 identifies or determines (401) the service level characteristics of the storage devices of a data storage assembly. Processing circuitry 372 can store these service level characteristics in characterization module 377 or one or more data structures associated therewith and stored in storage system 374.

In some examples, storage control system 370 can characterize the performance and power dissipations of HDDs 320-321 and SSD 322 to establish service level metrics. Alternatively, each of HDDs 320-321 and SSD 322 can each determine their own service level factors, such as performance and power characteristics for themselves and store the service level factors in non-transitory computer-readable media contained therein. In FIG. 3, service level modules (SLM) 330-331 of HDDs 320-321 and SSD 322 can determine performance and power characteristics for the associated storage device and report these performance and power characteristics to characterization module 377. These characterizations can be used to determine variability in the data storage devices for various operations or activities, such a read/write operations, seek operations, time to first bit operations, and data throughputs, among others.

The various service level factors mentioned above can be measured and quantified by the elements of storage assembly 310 to establish actual service level characteristics for the data storage devices. Various sensors, sensing elements, processing and monitoring elements, among other elements, can be employed to measure and quantify the service level characteristics of the data storage device. For example, power sensors can be employed in each storage device or in storage control system 370 to measure power consumption for various operations to determine the service level characteristics or deviations from manufacturer supplied service level characteristics.

Once the actual service level characteristics have been measured, determined, or otherwise identified, then these service level characteristics can be optionally normalized among the storage devices of data storage assembly 310. Variations among the storage devices and variations from manufacturer specified service level characteristics can be standardized to service level performance factors to present a consistent or standardized host-facing service level factor options. For example, if certain ones of the storage devices consume a first amount of power for first operations, such as seek operations, and second ones of the storage devices consume a second amount of power for the first operations, then storage control system 370 can normalize the power consumptions for the first operations among the various storage drives. In this manner, service level commands received for an entire storage assembly can be aggregated or allocated equally or intelligently across all storage drives of the storage assembly.

As discussed below, a host can select among service level options for storage assembly 310. However, in this example a consistent host-facing interface is provided which allows the host to select service level values from among a list or among ranges of service level factors. This host interface and list/range of service level factors is standardized based on the measured service level characteristics which can optionally be normalized across the storage devices in storage assembly 310. Thus, if there is variation in the performance or power dissipation of the individual storage devices, such as due to different device types or replacement devices introduced after the host selects service level values, then this variation is masked from the host. The actual performance or power dissipation of the storage devices is abstracted from the host interface and the host can remain consistent in selections for the service level values/ranges.

For example, if a first storage device has a first power consumption different than a second storage device, the power consumptions can be normalized to a standardized value and presented as standardized service level factors selectable by a host. Thus, a host need not be aware of the actual service level characteristics of the underlying storage devices and instead can select from among various performance characteristics or power dissipations.

Processing circuitry 372 presents (403) a service level interface to the host for selection of service level options, such as indicated by performance options 342 and power options 343 in FIG. 3. Service level (SL) interface 376 can present one or more interfaces for host system 350 or other host systems to select service level options including power dissipations or other performance options. SL interface 376 can comprise a driver installed on host system 350 for interfacing with storage assembly 310, such as a software element which interfaces with a kernel or operating system software of host system 310. SL interface 376 can present a list of standardized service level options that host system 350 can select among and select associated service level values.

In other examples, SL interface 376 comprises an application programming interface (API) which presents various inputs and outputs for host system 350 to interface with storage assembly 310. This API can present various service level selection options, including power ranges, power levels, times, time ranges, speeds, performance modes, or other service level options from which host system 350 can select among and provide service level values to storage control system 370 for controlling ones of the storage devices.

In further examples, SL interface 376 comprises a user interface, such as a console interface, terminal interface, text interface, or graphical user interface. This user interface presents various service level selection options, including power ranges, power levels, times, time ranges, speeds, performance modes, or other service level options from which host system 350 can select among and provide service level values to storage control system 370 for controlling ones of the storage devices.

Discrete commands can be issued by host system 350 to control specific aspects of the operation of the storage devices, such as for the service level options mentioned above. Some commands can indicate power levels for various service level options, while some commands can indicate performance levels for various service level options. In yet further examples, SL interface 376 comprises a service level query interface through which host system 350 can query for various service level options and service level values. Host system 350 can query SL interface 376 for which service level options and service level commands are available, for current service level settings or service level selections, and for what are the service level limits supportable currently by storage array 310.

As a specific example of SL interface 376, FIG. 5 is presented. FIG. 5 illustrates SL interface 500. SL interface 500 indicates three columns, namely a first column of service level options, a second column of service level value types, and a third column of service level value selections. The service level option column indicates a listing of various service level options that a host can select among to indicate service level values to control performance or power of storage assembly 310. The service level value type column indicates a unit or metric for the service level values, which can indicate a data type among various data types, and can indicate range types, selection types, or specific value types, among others. In some examples, the service level value type can be omitted. The service level value selection column indicates a specified value for each service level option which can be defined by the host.

In operation, host system 350 can be presented with SL interface 500 over storage link 360, or using a driver or API installed onto host system 350. Host system 350 can select among the various service level options and indicate specific values desired for each service level option. In FIG. 5, the third column indicates host-configurable values, whereas the first and second columns typically indicate storage array-defined labels and types.

Host system 350 can select specific ones of the service level options to modify or alter values for and indicate these values to storage assembly 310. In other examples, host system 350 can select a service level agreement (SLA) level which can indicate a suite of preselected service level options and service level values. For example, three SLA levels can be predefined by storage assembly 310 and host system 350 can select among these three levels depending upon the operation desired. A first SLA can correspond to a high power, high performance mode, a second SLA can correspond to a balanced power/performance mode, and a third SLA can correspond to a low power mode or low performance mode. Other SLA levels can be defined. In addition, host system 350 might modify service level options or service level values within a selected SLA level to customize the SLA to the desires of host system 350. Moreover, host system 350 can specify a custom mode which explicitly defines which service level options and service level values are to be modified.

For time-based selections, host system 350 can indicate a time in seconds or a time range. For throughput selections, a throughput in bits or bytes per second can be indicated. For voltage or power selections, a voltage or power in Watts can be indicated. Other selections can be made based on the value type, and either ranges or specific values can be specified. Selections can be discrete, granular, or continuous, among other distinctions.

Processing circuitry 372 receives (404) the service level selections from host system 350, such as indicated by performance selections 340 and power selections 341 in FIG. 3. The service level selections made by host system 350 can be indicated over link 360, such as using a series of commands or instructions which indicate the SLA levels, performance options, or performance values, power options, power levels, among other information. In many cases, the service level selections comprise power targets for storage assembly 310 or for the one or more data storage devices in storage assembly 310. In other cases, the service level selections can comprise performance targets, such as for the various performance factors indicated herein. These selections can be made on a per-array or per-assembly basis, but can also be made on a device basis, such as for specific ones of the data storage devices, or can be made on other granularities, for specific logical volumes, for only read operations or write operations, for a specific storage address range, or for specific storage transactions or storage operations, among other designations and granularities. Timers or counters can be indicated to only apply the selections for a predetermined duration or number of operations.

Power dissipation selections can be indicated by host system 350 in terms of how much energy is desired to be consumed within defined time windows. For example, host system 350 can indicate to limit peak power dissipation by specifying "<X joules within Y milliseconds" as a parameter, or indicate to limit average power dissipation by specifying "<A joules within B hours." Other power dissipation designations can be employed, such as instantaneous peak power dissipations in Watts.

When storage control system 370 or SL interface 376 receive service level selections for more than one of the data storage devices of storage assembly 310, such as for the entirety of storage assembly 310, then the service level selections can be allocated or distributed over various ones of the data storage devices of storage assembly 310 to achieve the service level selections. When multiple service level selections are made for storage assembly 310, then the service level selections can be aggregated and distributed over various ones of the data storage devices of storage assembly 310 to achieve the service level selections. For example, when a power dissipation level is specified for storage assembly 310, then storage control system 370 can subdivide the power level among the data storage devices of storage assembly 310 to allocate a portion of the power dissipation level to each of the data storage devices of storage assembly 310 and achieve the power dissipation level. In other examples, storage control system 370 can aggregate the service level selections among the data storage devices to establish the service level selections, such as when a bandwidth or throughput is specified by host system 350 and the throughput is allocated among the data storage devices according to a supportable throughput. Other performance factors can be allocated or aggregated among the data storage devices.

Processing circuitry 372 performs a validity check (405) on the selections, not only for syntax errors and the like, but also to determine if the selections correspond to supportable selections. In some examples, the specific storage devices or performance/power characteristics may not support certain selections made by host system 350, such as when the selections exceed performance/power limits of the various storage devices or exceed what characterization module 377 or HDDs 320-321 and SSD 322 indicates as possible for the storage devices to be controlled during operation. In some examples, SLM 330-332 of HDDs 320-321 and SSD 322 can receive the selections and determine if the selections are not supported. HDDs 320-321 and SSD 322 can then report this information to storage control system 370.

If the selections are not valid, then SL interface 376 indicates an error condition (406) to host system 350 using one or more error messages, such as by indicating which ones of the selections are not value and what values are supported currently. Other error indications can be indicated to host 350, and in graphical user interface examples values graphical flags or indicators can be shown to a user that indicate that a selection is invalid.

If the selections are valid, the SL interface 376 can indicate to processing circuitry 372 the selections and processing circuitry 372 can control (407) operations of the storage devices according to the performance selections. In FIG. 3, service level control module 378 can control the operations of the storage devices, namely HDDs 320-321 and SSD 322, in conjunction with controllers 380-382. These operations can include read and write operations as well as operations affected by the various performance factors indicated above, namely seek times, TTFB factors, spin up times for spindle components, rotation rates of the media, data throughputs, and power dissipations, among other performance factors. In further examples, just-in-time (JIT) seek techniques, or alterations in Background Media Scan (BMS) operations can be employed to hit performance or power dissipation targets.

The control of HDDs 320-321 and SSD 322 can be managed in combination by control module 378 and SLMs 330-332 in some examples. For instance, control module 378 can receive the service level selections transferred by host system 350 and transfer ones of the service level selections to SLMs 330-332 for implementation by associated data storage devices. Control module 378 or controllers 380-382 can identify appropriate commands to issue to HDDs 320-321 and SSD 322 to control HDDs 320-321 and SSD 322 according to the service level selections. HDDs 320-321 and SSD 322 can receive the commands and operate according to the service level selections. In further examples, control module 378 can implement the service level selections to control data HDDs 320-321 and SSD 322 directly. Specifically, power levels might specified by host system 350, and control module 378 can determine associated performance values or performance levels that corresponds to the desired power levels, and control associated ones of HDDs 320-321 and SSD 322 according to the determined performance levels or values. In other examples, SLMs 330-332 can receive performance or power commands from storage control system 370 and implement the performance or power commands in accordance with the specified service level selections.

Since standardized or normalized service level options are presented to host system 350 in this example, service level control module 378 can translate the standardized or normalized service level values or selections to control the specific data storage devices according to each of the characteristics of the devices determined during the characterization operations. Service level control module 378 can reference any data structures which stores the service level characterization data determined in operation 401 or the normalization information determined in operation 402, and establish actual control parameters for each of the storage devices that enact the performance or power values or selections made by host system 350.

Seek times for rotating media can be controlled by varying a drive voltage for associated armature/voicecoil elements, and host system 350 can specify a seek time in seconds (milliseconds) or by specifying a peak voltage or peak power employed to position the read/write heads during seek operations. TTFB times can be controlled by altering seek times for rotating media as well as spindle spin-up times, among other factors for a storage device. Host system 350 can specify a TTFB in seconds or milliseconds, or can specify a peak power dissipation for TTFB operations. Spin up times for spindle components can also be controlled by altering power consumption by associated motor/spindle assemblies, and host system 350 can specify a time or power value. The specific performance controls effected by storage control system 370 are affected by the measured performance metrics or performance characteristics, such as actual in-situ measurements for spindle speed, minimum TTFB, minimum seek time, among other measurements, including power dissipations for each.

Throughput can be controlled by establishing a rate at which read operations and write operations are serviced by HDDs 320-321 and SSD 322, such as a target or maximum read or write storage operations per second. Throttling of throughput can be handled in control system 370, such as by a rate at which operations are managed in processing circuitry 372, drive controllers 308-382, or host interface 371. HDDs 320-321 and SSD 322 can also be instructed by control system 370 to conform to a target throughput. In examples where other data storage devices are employed, such as solid state drives or also in hybrid drives which include solid state memory elements, read/write throughput can also be controlled or throttled to adjust power consumption of the data drives.

Seek operations of the data storage devices in storage assembly 310 can be modified to alter a peak speed or peak voltage of the various electromechanical elements which move or position the read/write heads, such as voicecoil and armature elements. This alteration in peak speed or peak voltage can lead to different power dissipation by those elements, different power dissipation of each storage device, and also in the aggregate by the data storage system.

Various adjustments to seek properties of data storage devices can be made. For example, a seek profile can be adjusted for one or more of data storage devices which reduces a peak power dissipation over a range of seek operations. For example, shorter seek operations can have less of a reduction in tracking speed than longer seek operations, to provide for a net decrease in power dissipation. In other examples, all seek operations are reduced by a predetermined amount, such as a percentage of speed, time, velocity, acceleration, or power usage to position associated read/write heads.

However, in spinning media, even if the read/write head is positioned to a proper circumferential location, namely a data track, the media might still need to make a portion of a full rotation to place a desired data block under the read/write head. This process of moving the read/write heads to a desired track position is typically referred to as a seek operation. Various power control techniques can be employed for the read/write operations of HDDs, such as just-in-time (JIT) seek techniques. JIT seek techniques can take advantage of seek delays in positioning of data blocks on the spinning media under the read/write heads to control power dissipation by associated armatures and positioning components. Various tracking algorithms can identify a position of the spinning media relative to a current read/write head position and establish a time to move the read/write heads to a desired position so as to meet the desired data block at a desired time without extra rotational delays incurred after positioning of the read/write head. These JIT techniques typically use less peak power than merely positioning the read/write head as fast as the electromechanical elements allow. Additionally, JIT techniques can include various selectable levels of seek performance, such as 256 levels in some examples, or a subset thereof.

When non-rotating media are employed, such as solid state media, performance adjustments can be made, such as reducing a throughput of associated solid state storage components, throttling a write performance of the solid state media to limit power consumption for write operations, or halting write operations to flash media while caching pending write data in other solid state media, such as non-volatile memory or volatile memory.

Other adjustments include reducing or halting background media scans (BMS) or data integrity checks of data storage devices. In further examples, ones of the data storage devices can be powered down or have associated rotating media spun down to a slower rate or halted operation to reduce power consumption of storage array 310. Combinations of these techniques can be employed, and these changes can be applied across only selected ones of the data storage devices as well as to the entire collection of data storage devices.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a data storage system, the method comprising:
    storing data in and retrieving data from a plurality of data storage devices;
    in a host interface, receiving storage operations transferred by a host system for handling by the data storage system;
    in a service level interface, presenting service level options to the host system over the host interface and receiving service level selections indicated by the host system for service level control of the plurality of data storage devices, wherein the service level selections affect multiple data storage devices of the plurality of data storage devices;
    allocating the service level selections among the plurality of data storage devices to achieve the service level selections while accounting for at least device-to-device variability among the multiple data storage devices; and
    controlling an electromechanical element of each data storage device of the plurality of data storage devices according to the allocated service level selections normalized across the data storage devices of the plurality of data storage devices to operate the data storage devices according to a desired peak power dissipation.

2. The method of claim 1, further comprising:
    standardizing the service level options based at least on measured service level characteristics of the data storage devices normalized among the plurality of data storage devices; and
    presenting the service level options to the host system responsive to a service level query issued by the host system.

3. The method of claim 1, further comprising:
    characterizing performance information and power information of the plurality of data storage devices using at least measurements of the performance information and the power information for the data storage devices to establish service level metrics for the plurality of data storage devices.

4. The method of claim 3, further comprising:
    normalizing the service level metrics among variations in the performance information and the power information across the data storage devices in the plurality of data storage devices; and
    establishing service level targets for each of the data storage devices based on the normalized service level metrics, wherein the service level targets are used to individually operate the data storage devices according to the service level selections and standardize the service level options for presentation to the host system.

5. The method of claim 3, further comprising:
    determining when a service level selection cannot be achieved for at least one data storage device based at least on the service level metrics; and
    responsively indicating an error condition to the host system.

6. The method of claim 1, wherein the service level selections comprise power targets and performance targets for the plurality of data storage devices.

7. The method of claim 1, wherein:
    the service level selections comprise one or more selections among power targets and performance targets for the plurality of data storage devices;
    the performance targets comprise at least one of time to first byte (TTFB) performance, spin-up performance of an associated spindle, seek performance of associated read/write heads, and data throughput to the host system; and
    the power targets comprise at least one of a peak power target and an average power target.

8. A data storage system, comprising:
    an array of data storage devices comprising media for storage and retrieval of data;
    a host interface configured to receive storage operations transferred by a host system for handling by the data storage system;
    a service level interface configured to:
        present service level options to the host system over the host interface; and
        receive service level selections indicated by the host system for service level control of the array of data storage devices, wherein the service level selections affect multiple data storage devices of the array of data storage devices; and
    a storage control system configured to:
        allocate the service level selections among the multiple data storage devices to achieve the service level selections while accounting for at least device-to-device variability among the multiple data storage devices; and
        operate at least one electromechanical element of each data storage device of the array of data storage devices according to the allocated service level selections normalized across the data storage devices to a desired power dissipation level.

9. The data storage system of claim 8, wherein:
    the service level options are standardized based at least on measured service level characteristics of the data storage devices normalized among the array of data storage devices; and the service level interface is further configured to present the service level options to the host system responsive to a service level query issued by the host system.

10. The data storage system of claim 8, wherein the storage control system is further configured to:
characterize performance information and power information for the data storage devices in the array of data storage devices using at least measurements of the performance information and the power information for the data storage devices to establish service level metrics for the array of data storage devices.

11. The data storage system of claim 10, wherein the storage control system is further configured to:
normalize the service level metrics among variations in the performance and power information across the data storage devices in the array of data storage devices; and
establish service level targets for each of the data storage devices based on the normalized service level metrics, wherein the service level targets are used by the storage control system to individually operate the data storage devices according to the service level selections and standardize the service level options for presentation to the host system.

12. The data storage system of claim 10, wherein the storage control system is further configured to:
determine when a service level selection cannot be achieved for at least one data storage device based at least on the service level metrics; and
responsively indicate an error condition to the host system.

13. The data storage system of claim 8, wherein the service level selections comprise power targets and performance targets for the array of data storage devices.

14. The data storage system of claim 8, wherein:
the service level selections comprise one or more selections among power targets and performance targets for the array of data storage devices;
the performance targets comprise at least one of time to first byte (TTFB) performance, spin-up performance of an associated spindle, seek performance of associated read/write heads, and data throughput to the host system; and
the power targets comprise at least one of a peak power target and an average power target.

15. An interface for a data storage apparatus comprising:
a host interface configured to receive storage operations transferred by a host system for handling by the data storage apparatus;
a service interface configured to:
present service level options to the host system for altering performance levels of data storage devices across an array of data storage devices associated with the service interface, wherein each data storage device of the array of data storage devices comprises at least one electromechanical element; and
receive one or more service level selections indicated by the host system, wherein the one or more service level selections affect multiple data storage devices of the array of data storage devices; and
a storage control system configured to:
distribute the one or more service level selections among multiple data storage devices of the array of data storage devices while accounting for device-to-device variability; and
control the at least one electromechanical element of each data storage device of the array of data storage devices according to the distributed one or more service level selections normalized across the data storage devices of the array of data storage devices to operate the data storage devices according to a desired power dissipation level.

16. The interface of claim 15, wherein:
the one or more service level selections comprise one or more selections among power targets and performance targets for the array of data storage devices;
the performance targets comprise at least one of time to first byte (TTFB) performance, spin-up performance of an associated spindle, seek performance of associated read/write heads, and data throughput to the host system; and
the power targets comprise at least one of a peak power target and an average power target.

17. The interface of claim 15, wherein:
the service level options are standardized based at least on measured service level characteristics of the data storage devices normalized among the array of data storage devices.

18. The interface of claim 15, wherein:
the service level interface is configured to present the service level options to the host system responsive to a service level query issued by the host system.

19. The interface of claim 15, wherein the storage control system is further configured to:
characterize performance information and power information for the data storage devices in the array of data storage devices using at least measurements of the performance information and the power information for the data storage devices to establish service level metrics for the array of data storage devices.

20. The interface of claim 19, wherein the storage control system is further configured to:
normalize the service level metrics among variations in the performance and power information across the data storage devices in the array of data storage devices; and
establish service level targets for each of the data storage devices based on the normalized service level metrics, wherein the service level targets are used by the storage control system to individually operate the data storage devices according to the service level selections and standardize the service level options for presentation to the host system.

21. A storage system comprising:
multiple storage means for storing and retrieving data, wherein the storage means comprises:
rotating media means for storing data; and
electromechanical means for positioning read/write heads in relation to the rotating media means;
communication means for transferring storage operations from a host system to the storage means;
service interface means for receiving a power mode selection from the host system;
allocation means for allocating the power mode selection among the multiple storage means while accounting for variability among the multiple storage means; and
control means for operating the electromechanical means based on the power mode selection to achieve a desired power dissipation level.

* * * * *